June 30, 1970 J. P. ANDELIN ET AL 3,518,164
DIAGNOSTIC SPUTUM COLLECTION SYSTEM
Filed April 11, 1967 3 Sheets-Sheet 1

INVENTORS
JOHN PHILIP ANDELIN
JAY H. MOODY
BY
*Kane, Dalsimer, Kane, Sullivan & Smith*
ATTORNEYS

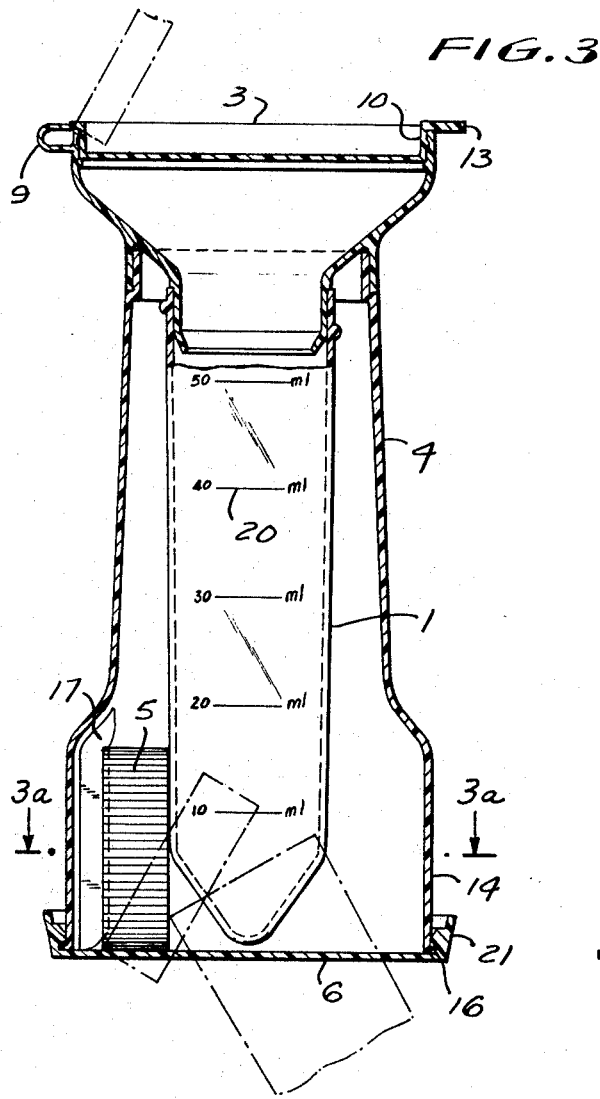
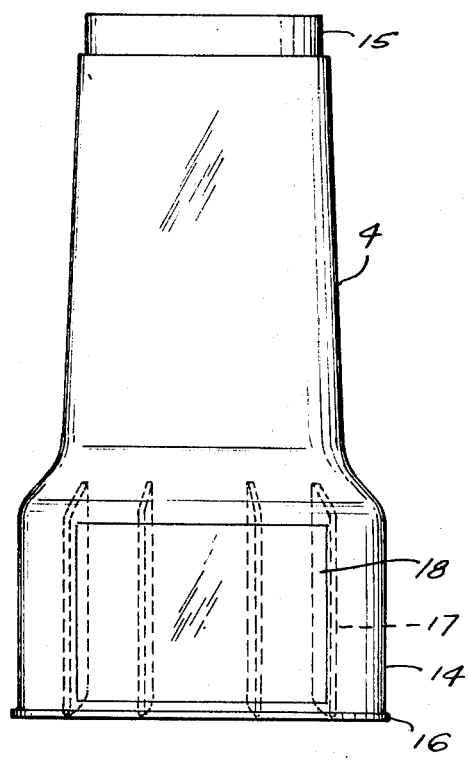
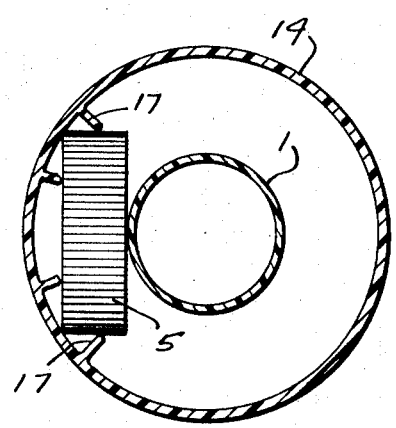
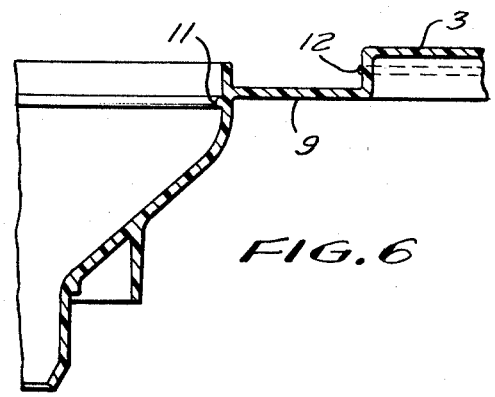

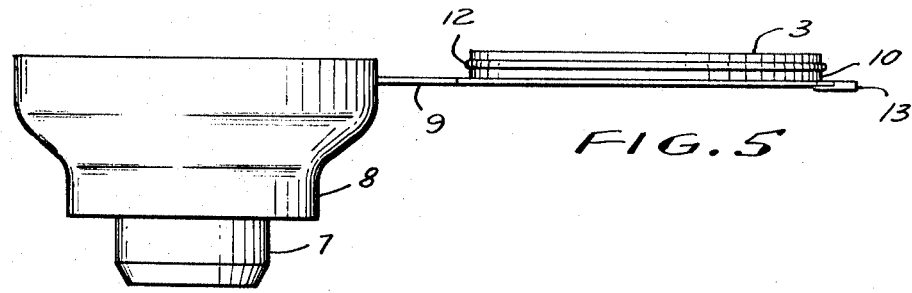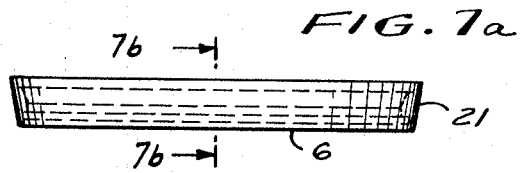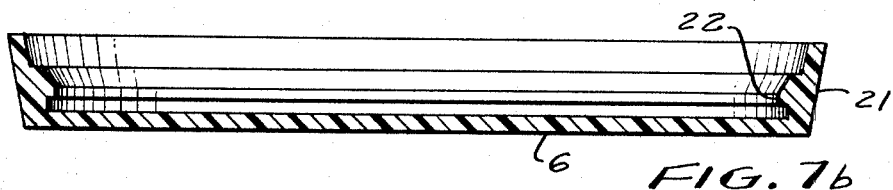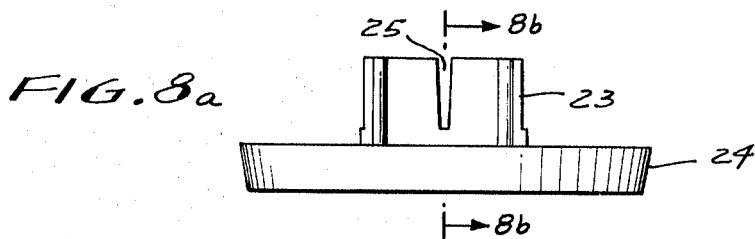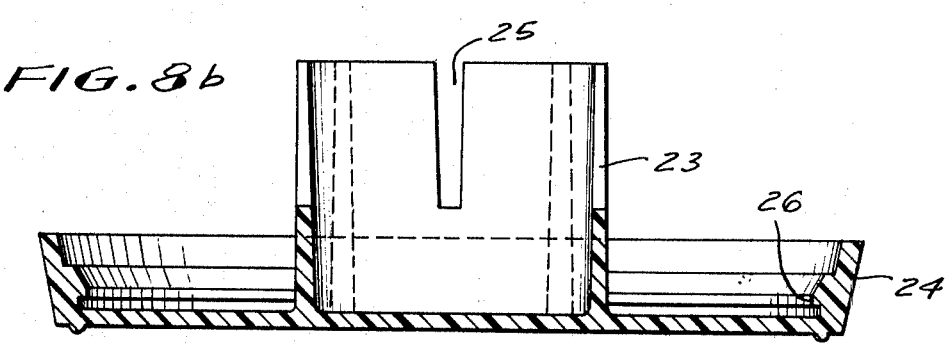

United States Patent Office 3,518,164
Patented June 30, 1970

3,518,164
DIAGNOSTIC SPUTUM COLLECTION SYSTEM
John Philip Andelin, Los Angeles, and Jay H. Moody, Northridge, Calif., assignors to B-D Laboratories, Inc., East Rutherford, N.J., a corporation of Delaware
Filed Apr. 11, 1967, Ser. No. 630,099
Int. Cl. C12k 1/04
U.S. Cl. 195—127
8 Claims

ABSTRACT OF THE DISCLOSURE

A sputum collection system is disclosed wherein a graduated elongated specimen receptacle is provided which communicates with and is removably held by the discharge tube of a funnel. The receptacle and funnel assembly is secured to and supported in vertical position by an outer protective body in which the specimen receptacle is coaxially enclosed. The specimen receptacle is removable from the funnel through the open flared base of the outer protective body and is provided with a sealing screw cap.

BACKGROUND OF THE INVENTION

Field of the invention

This invention relates to a new and improved sputum collection system, particularly useful in collecting, handling, and testing sputum specimens in suspected or proved cases of mycobacterial and other pulmonary infections, designed to minimize the risk of spreading infection by personnel handling such specimens.

Description of the prior art

Present apparatus for and methods of collecting sputum specimens do not offer complete protection to personnel-collecting, handling, and testing the specimen, from hospital attendants to laboratory technicians, because the specimen is not sufficiently isolated and subsequent transfer of the specimen to other receptacles is necessary for centrifuging and performing diagnostic tests.

SUMMARY OF THE INVENTION

It is an object of this invention to provide a hygienic sputum collection system for collecting, handling, and testing sputum specimens in suspected and proved cases of bacterial pneumonias, bronchiectasis mycoses, lung abscesses, mycobacterial infections, and other pulmonary infections.

Another object of the invention is to provide a method for collecting, handling, and testing sputum specimens that minimizes the risk of spreading infection by personnel handling the sputum specimens, particularly the laboratorian.

A further object of the invention is to eliminate the step of transferring sputum specimens from an original container into a separate centrifuge tube or diagnostic test tube and provide a specimen receptacle which can be centrifuged at moderate speeds up to 3500 r.p.m.

Another object of the invention is to provide a sputum collection system that may be mass produced and easily handled for institutional and field use, that is esthetically and functionally designed, and that may be used for other specimens as well.

Yet another object of the invention is to provide a sanitary transparent bag in conjunction with the sputum collection system to facilitate sanitary handling of the system.

In order to accomplish these results, my invention contemplates the provision of a graduated elongated specimen receptacle which may also be used as a centrifuge tube and diagnostic test tube communicating with and removably held by the discharge tube of a funnel. My invention also contemplates the provision of an outer protective columnar body in which the specimen receptacle is coaxially held and which is secured at its upper end to the undersurface of the funnel and which is open at its base so that the specimen receptacle may be removable from the funnel through the open base of the outer protective body.

In addition, my invention contemplates that pressure sealing caps may be provided for the specimen receptacle, the mouth of the funnel, and the base of the outer protective body. Furthermore, a sanitary bag to facilitate hygienic handling of the sputum collection system may be provided.

BRIEF DESCRIPTION OF THE DRAWINGS

FIG. 3 is a partially sectional side elevation view of the assembled sputum collection system illustrated in FIG. 2 along the line 3—3;

FIG. 3a is a sectional side elevation view from above of the assembled sputum collection system illustrated in FIG. 3 along the line 3a—3a.

FIG. 4 is a side elevation view of the outer protective columnar body illustrated in the preceding figures;

FIG. 5 is a side elevation view of the funnel and funnel cover assembly of the sputum collection system illustrated in the preceding figures;

FIG. 6 is a fragmentary sectional side elevation view of the funnel and funnel cover assembly illustrated in FIG. 5 along the line 6—6;

FIG. 7a is a side elevation view of the cap for the base of the outer protective body illustrated in the preceding figures;

FIG. 7b is a cross-sectional view of the cap illustrated in FIG. 7a along the line 7b—7b;

FIG. 8a is a side elevation view of an alternative form of cap for the base of the outer protective body; and FIG. 8b is a cross-sectional view of the cap illustrated in FIG. 8a along the line 8b—8b.

DESCRIPTION OF THE PREFERRED EMBODIMENTS

Figure 1:
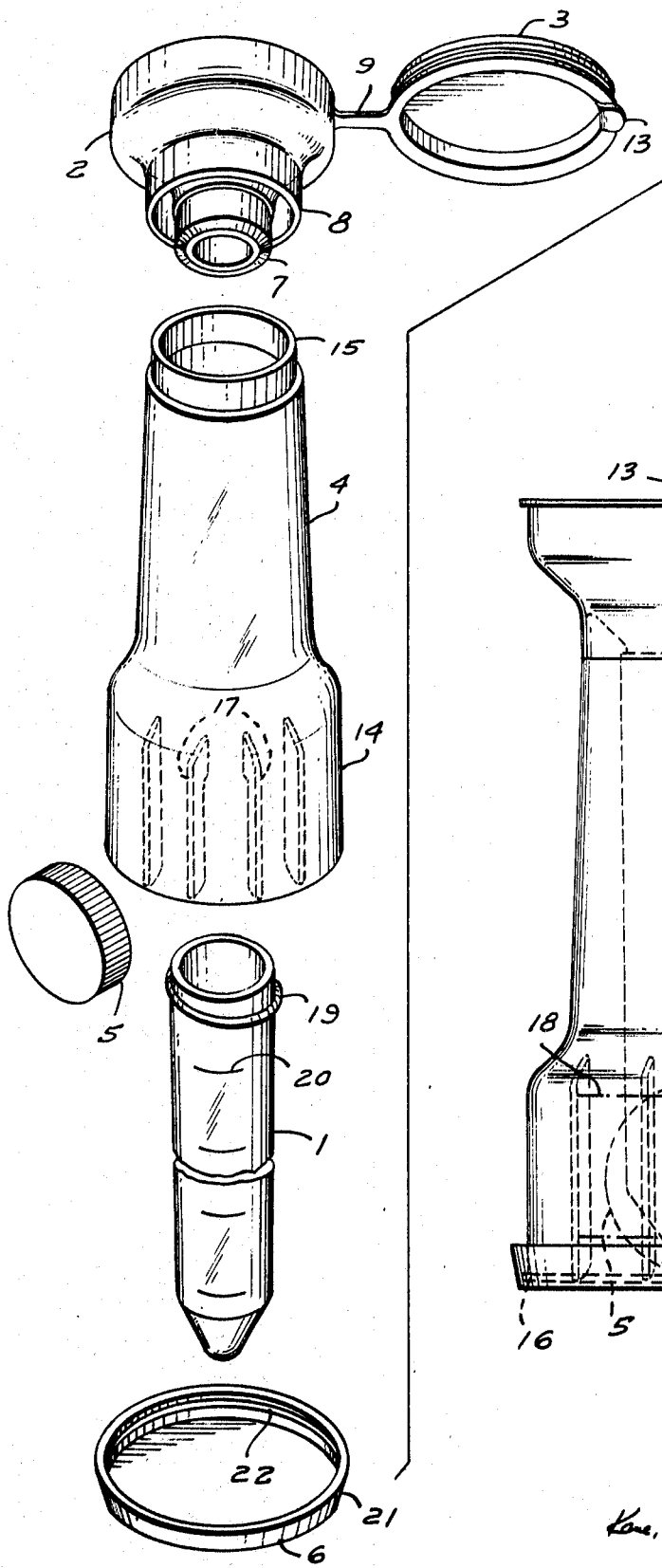
FIG. 1 is an exploded perspective view of a sputum collection system embodying my invention.
Figure 2:
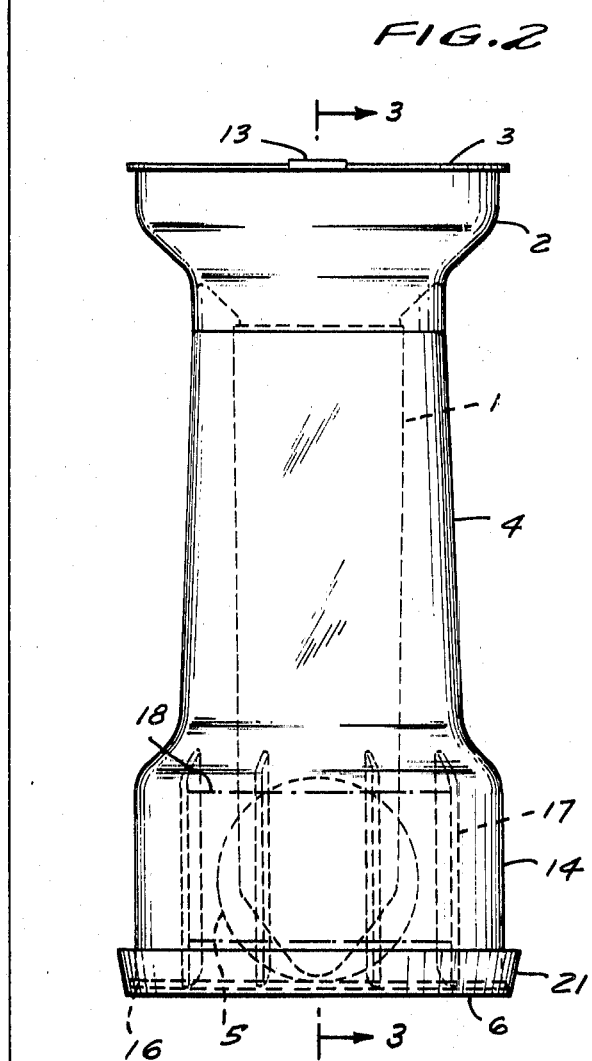
FIG. 2 is a side elevation view of the sputum collection system illustrated in FIG. 1 in assembled form.

In the embodiment of my invention illustrated in FIGS. 1 to 3 I provide a graduated elongated specimen receptacle 1, a funnel 2 and hinged funnel cover 3, an outer protective columnar body 4, a screw cap 5, and a cap 6 for the base of the outer protective body.

Referring more particularly to the funnel and funnel cover assembly as illustrated in FIGS. 5 and 6, located on the undersurface of the funnel are concentric annular rings 7 and 8 which simultaneously frictionally engage the internal specimen receptacle 1, and the outer protective body 4 respectively. Annular ring 7 communicates with the inner surface of the funnel and is adapted to slide within the open end of the specimen receptacle to thereby prevent contamination of the upper rim of the receptacle. Thus, the unit is designed so that sputum goes directly from the funnel into the specimen receptacle with no retention of sputum in the funnel or contact of the sputum with the rim of the specimen receptacle. Annular ring 8 is adapted to overlap the outer protective body. Both rings frictionally engage the specimen receptacle and protective body respectively to form pressure seals and rigidly maintain the specimen receptacle and protective body in coaxial relationship.

Attached to the top of the funnel by hinge 9 is the funnel cap 3 formed with flared edges 10 so that the cap may be seated inside the upper edge of the mouth of the funnel to form a pressure closure. Annular ring 11 within the upper edge of the funnel prevents the cover 3 from sliding too far into the funnel, and annular rim lip 12 around the flared edge 10 of the funnel cover facilitates pressure sealing closure. On the edge of the cap is a finger tab 13 to facilitate opening and closing.

The outer protective body 4 illustrated in FIGS. 1–4 comprises an annular column sloping with increasing width towards its base and flared at its base 14. The upper edge of the column is indented to form a rim 15 which may be seated within the annular ring 8 on the undersurface of the funnel 2. The lower edge of the flared base protrudes slightly to form an annular lip 16 which may be seated within the base cap 6.

Within the flared base of the protective body are four ribs 17 formed against the inner surface of the body and adapted to hold a screw cap 5 along the inside of the surface of the outer protective body, as illustrated in FIG. 3a. A portion of the outer surface 18 of the outer protective body 4 may be roughened or "frosted" as by sand blasting or other means to provide an adhering surface to which a label may be adhered.

The sputum specimen receptacle 1 illustrated in FIGS. 1 and 3 is closed at its bottom end and open at the top so that the annular ring 7 of the funnel 2 may be frictionally seated therein. On the outer surface of the upper edge of the receptacle I provide a thread 19 to engage the inner thread of the screw cap 5. I also provide a graduated scale 20 of inscribed indicia to indicate the quantity of specimen being handled. The capacity of the receptacle in the illustrated embodiment of my invention is approximately 50 milliliters. The graduations on the 50 milliliter tube may be at 2.5, 5, 7.5, and 10 milliliters and at increments of 5 milliliters up to 50, or otherwise distributed depending on the scale required. By shape, structure, and by size the receptacle is also adapted to be used as a centrifuge tube.

The base cover 6 for the outer protective body 4 is illustrated in FIGS. 7a and 7b and comprises a rim 21 including an annular projection 22 beneath which the projecting lip 16 at the base of the outer protective body may be seated to form a pressure sealing closure.

An alternative form of base cap is illustrated in FIGS. 8a and 8b comprising a cap as illustrated in FIG. 7a further provided with an internal annular ring 23 positioned concentrically within the outer rim 24 and projecting upward with greater height. The projection 23 must be of sufficient height to engage and provide further support for the sputum specimen receptacle when the sputum collection system is assembled. Furthermore, the projection 23 may be used as a holder for the specimen receptacle when the cover is removed. Indentations 25 are adapted to permit pressure expansion of the annular projection 23 so that the specimen receptacle may be securely held therein. Within the cover rim 24 there is an annular projection 26 similar to that formed in the cap illustrated in FIG. 7b beneath which the protruding lip 16 at the base of the outer protective body may be seated to form a pressure closure.

The assembled sputum collection system may be packaged in a transparent synthetic bag which may be used in conjunction with the system to facilitate sanitary handling as described below.

In using my invention the assembled system is removed from the bag in which it is packaged. A label may be supplied with the system and pertinent information relating to the patient may be filled out thereon and adhered to the frosted area on the outer surface of the outer protective body. The hinged funnel lid may then be lifted by means of the finger tab for collection of sputum in the receptacle via the funnel as illustrated in phantom in FIG. 3. After each use of the system the hinged lid is closed tightly to isolate the specimen. When a sufficient volume of the specimen has been accumulated in the receptacle, the transparent synthetic bag in which the system was packaged may then be slipped down over the unit from the top to insure hygienic protection. The sputum collection system covered with the bag may then be gripped securely about the outer protective body, the base cap removed, and the specimen receptacle grasped through the open base of the outer protective body.

Keeping the system vertical the specimen receptacle is then carefully removed by loosening the receptacle from the discharge tube of the funnel and pulling the receptacle downward through the opening at the base of the outer protective body. As the receptacle is removed the rest of the system may be tilted slightly with the retained screw cap on the upper side. The upper edge of the specimen receptacle may then engage the inner surface of the screw cap and the screw cap may be gently removed from the unit, as illustrated in phantom in FIG. 3. Upon removal of the receptacle with the screw cap loosely placed thereon the screw cap may be tightened and a label affixed to the receptacle.

The specimen is then ready for transfer to the laboratory and may be mailed in a suitable double mailing container that meets United States Postal Regulations. The receptacle is constructed from material such as polypropylene with sufficient structural properties so that it may be itself centrifuged at moderate speeds up to 3500 r.p.m. Furthermore, diagnostic testing including digestion and selective decontamination procedures using sodium hydroxide, trisodium phosphate, N-acetyl-l-cysteine, oxalic acid, trypsin and other chemicals may be performed all without transfer of the specimen from the receptacle. The sputum collection system is disposable and recommended procedures may be used for disposing of the unit after use such as by autoclaving or incineration.

Thus, a specimen can be collected and transported to the laboratory then tested without personnel touching any of the contaminated parts.

The various parts comprising the sputum collection system may be manufactured from plastic or other synthetic materials of various densities and structural properties. The parts may be manufactured from the same material or different materials. Thus, the outer protective body may be of a relatively rigid material to provide structural support for the system. The caps, however, may be of a more flexible material. As an example, the outer protective body may be molded from styrene and provided with a translucent amber color for esthetic appearance. The sputum receptacle may be of molded translucent polypropylene, and the lid, funnel, screw cap and base from polyethylene.

We claim:

1. A sputum collection system comprising:
an elongated specimen receptacle closed at one end and open at the opposite end;
a funnel having a mouth and also having a discharge tube to which the elongated specimen receptacle is removably secured so that the discharge tube communicates with the inside of said receptacle;
a funnel cover hingedly connected to the funnel and adapted to form a pressure sealing closure over the mouth of the funnel when placed in position;
an outer protective body being open at its base and secured at its opposite end to the undersurface of the funnel, adapted to support said receptacle and funnel in a vertical position, and coaxially enclosing the receptacle whereby said receptacle is removable from the discharge tube of the funnel through the open base of the outer protective body; and
the outer surface of the open end of the elongated specimen receptacle being formed with at least one thread, a threaded cap and ribs being in the base of the outer support column whereby the cap is held in the base of the outer support column and is adapted to catch the threads on the elongated specimen receptacle upon removal of the receptacle from the base of the outer protective body, and engage the threads on said receptacle in pressure sealing relationship when the threaded cap is screwed onto the receptacle.

2. A sputum collection system comprising:

an elongated specimen receptacle closed at one end and open at the opposite end;

a funnel having a mouth and also having a discharge tube to which the elongated specimen receptacle is removably secured so that the discharge tube communicates with the inside of said receptacle;

a funnel cover hingedly connected to the funnel and adapted to form a pressure sealing closure over the mouth of the funnel when placed in position;

an outer protective body being open at its base and secured at its opposite end to the undersurface of the funnel, adapted to support said receptacle and funnel in a vertical position, and coaxially enclosing the receptacle whereby said receptacle is removable from the discharge tube of the funnel through the open base of the outer protective body; and a cap being provided for the base of the outer protective body adapted to form a pressure sealing closure over the base of the outer protective body when placed in position.

3. A sputum collection system as set forth in claim 2 in which said base cap is further provided with an inner annular projection adapted to engage the closed end of the elongated specimen receptacle when the base cap is positioned on the base of the outer protective body to thereby provide further support for said receptacle, and provide a holder for said receptacle when the base cap is removed.

4. A sputum collection system comprising a graduated elongated specimen receptacle closed at one end and open at the opposite end and formed with at least one thread about the outer surface of the open end;

a funnel having a mouth and also having a discharge tube to which the elongated specimen receptacle is removably secured so that the discharge tube communicates with the inside of said receptacle, said funnel also having a funnel cap hingedly secured thereto and adapted to be seated in the mouth of the funnel to form a pressure sealing closure;

an outer protective body with an open base secured at its opposite end to the undersurface of the funnel and in which the elongated specimen receptacle is coaxially enclosed to thereby support said receptacle and funnel in a vertical position, said receptacle being removable from the funnel through the base of said outer protective body;

a base cap adapted to fit over the base of the outer protective body and form a pressure sealing closure;

a threaded cap held in the base of the outer protective body and adapted to catch the threads on the calibrated elongated specimen receptacle upon removal of the receptacle from the base of the outer protective body and form a pressure sealing closure therewith when the threaded cap is screwed onto the receptacle.

5. A sputum collection system as set forth in claim 4 wherein a sanitary transparent bag encloses the system.

6. A method of hygienically collecting and handling a diagnostic specimen in an elongated specimen receptacle removably secured to the discharge tube of a funnel provided with a funnel cap and further provided with an outer protective body open at its base and secured to the undersurface of the funnel to thereby support the funnel and receptacle in a vertical position, and also provided with a cap removably held in the base of the outer protective body adapted to form a pressure sealing closure with said receptacle comprising the steps of:

collecting a discharge of the specimen to be diagnosed in the mouth of the funnel;

passing the specimen so collected through the discharge tube of the funnel into the elongated specimen receptacle;

placing the funnel cap over the mouth of the funnel to isolate the specimen between each collection of a discharge of the specimen to be diagnosed; accumulating in the receptacle a sufficient quantity of the specimen to be diagnosed; removing from the discharge tube of the funnel through the open base of the outer protective body the elongated specimen receptacle wherein a sufficient volume of the specimen has been accumulated;

catching the receptacle cap, held in the base of the outer protective body on the open end of the receptacle as it is removed through the base of the outer protective body;

tightening the cap on the receptacle to form a pressure sealing closure.

7. A method of hygienically collecting and handling a diagnostic specimen as set forth in claim 6 further provided with the step of placing a sanitary transparent bag over the funnel, receptacle, and outer protective body assembly when gripping the assembly to remove the receptacle from the open base of the outer protective body.

8. A method as set forth in claim 6 provided with the final step of disposing of the used collecting and handling apparatus by sanitary means.

References Cited

UNITED STATES PATENTS

| | | | |
|---|---|---|---|
| 2,112,465 | 3/1938 | Maish | 220—17 |
| 2,218,002 | 10/1940 | Hamilton | 4—258 |
| 2,835,246 | 5/1958 | Boettger | 220—17 XR |

ALVIN E. TANENHOLTZ, Primary Examiner

M. D. HENSLEY, Assistant Examiner

U.S. Cl. X.R.

195—103.5; 220—17; 4—254; 128—2; 23—292